(12) United States Patent
Hudson et al.

(10) Patent No.: US 10,094,420 B1
(45) Date of Patent: Oct. 9, 2018

(54) SQUEEZE FILM DAMPER WITH LOW PRESSURE RESERVOIRS

(71) Applicant: United Technologies Corporation, Farmington, CT (US)

(72) Inventors: David B. Hudson, Tequesta, FL (US); Gregory M. Savela, Stuart, FL (US); Robert J. Morris, Portland, CT (US); Christopher J. Zuck, Stevenson Ranch, CA (US); Daniel L. Gysling, South Glastonbury, CT (US); Alan J. Goetschius, Amston, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/470,252

(22) Filed: Mar. 27, 2017

(51) Int. Cl.
*F16C 27/00* (2006.01)
*F16C 27/04* (2006.01)

(52) U.S. Cl.
CPC .................. *F16C 27/045* (2013.01)

(58) Field of Classification Search
CPC ..................................................... F16C 27/045
See application file for complete search history.

(56) References Cited

U.S. PATENT DOCUMENTS

| | | | |
|---|---|---|---|
| 5,067,825 A * | 11/1991 | Vance ................. | F16F 15/0237 384/99 |
| 5,071,262 A | 12/1991 | Monzel et al. | |
| 5,110,257 A * | 5/1992 | Hibner ................. | F01D 25/164 415/119 |
| 5,178,400 A | 1/1993 | Singh | |
| 5,344,239 A * | 9/1994 | Stallone ............... | F01D 25/164 384/99 |
| 5,738,356 A | 4/1998 | Marshall | |
| 6,872,003 B2 | 3/2005 | Dusserre-Telmon et al. | |

(Continued)

FOREIGN PATENT DOCUMENTS

| WO | WO2009047538 A1 | 4/2009 |
|---|---|---|
| WO | WO2014131413 A1 | 9/2014 |
| WO | WO2016031013 A1 | 3/2016 |

OTHER PUBLICATIONS

Extended European Search Report for European Patent Application No. 18161544.4, dated Aug. 28, 2018, 9 pages.

*Primary Examiner* — Thomas R Hannon
(74) *Attorney, Agent, or Firm* — Kinney & Lange, P.A.

(57) ABSTRACT

A squeeze film damper includes a static member and a whirling member positioned adjacent to the static member. A gap is formed between the static member and the whirling member. A pressurized oil reservoir is formed in the gap between the static member and the whirling member. A first low pressure oil reservoir is formed in a first cavity in the whirling member, wherein the first low pressure oil reservoir is positioned on a first end of the pressurized oil reservoir. A second low pressure oil reservoir is formed in a second cavity in the whirling member, wherein the second low pressure oil reservoir is positioned on a second end of the pressurized oil reservoir. A first primary seal is positioned between the first end of the pressurized oil reservoir and the first low pressure oil reservoir, and a second primary seal is positioned between the second end of the pressurized oil reservoir and the second low pressure oil reservoir.

20 Claims, 2 Drawing Sheets

(56) References Cited

U.S. PATENT DOCUMENTS

| | | | |
|---|---|---|---|
| 7,040,811 B2 * | 5/2006 | Dusserre-Telmon | ........................ F16C 27/045 384/475 |
| 7,517,152 B1 * | 4/2009 | Walsh | ..................... F16C 23/08 384/99 |
| 7,798,720 B1 * | 9/2010 | Walsh | ................... F04D 29/126 384/99 |
| 9,494,048 B1 | 11/2016 | Pamin | |
| 2002/0136473 A1 * | 9/2002 | Mollmann | ............ F01D 25/164 384/99 |
| 2017/0307046 A1 * | 10/2017 | Steen | ...................... F01D 25/04 |

* cited by examiner

SQUEEZE FILM DAMPER WITH LOW PRESSURE RESERVOIRS

BACKGROUND

The present invention relates to dampers, and in particular, to a squeeze film damper.

Squeeze film dampers are frequently used in high speed rotating machines to control the adverse dynamic response. Squeeze film dampers include a pressurized oil reservoir formed in a gap between a whirling member and a static member of a rotary machine. A seal is formed on either end of the pressurized oil reservoir to maintain the oil in the pressurized oil reservoir. Squeeze film dampers provide hydrodynamic stiffness and damping in rotary machines.

During operation, air can leak into the pressurized oil reservoir as the whirling member rotates against the static member. The air that leaks into the pressurized oil reservoir forms a high and a low pressure side of the oil film cavity. This can cause damage to the squeeze film damper during operation, reducing the hydrodynamic stiffness and damping ability of the squeeze film damper. When squeeze film dampers are damaged, vibrations caused by the whirling member can damage the static member and any components associated with the static member.

SUMMARY

A squeeze film damper includes a static member and a whirling member positioned adjacent to the static member. A gap is formed between the static member and the whirling member. A pressurized oil reservoir is formed in the gap between the static member and the whirling member. A first low pressure oil reservoir is formed in a first cavity in the whirling member, wherein the first low pressure oil reservoir is positioned on a first end of the pressurized oil reservoir. A second low pressure oil reservoir is formed in a second cavity in the whirling member, wherein the second low pressure oil reservoir is positioned on a second end of the pressurized oil reservoir. A first primary seal is positioned between the first end of the pressurized oil reservoir and the first low pressure oil reservoir, and a second primary seal is positioned between the second end of the pressurized oil reservoir and the second low pressure oil reservoir.

A machine includes a static member, a whirling member positioned adjacent to the static member, and a squeeze film damper formed with the static member and the whirling member. The squeeze film damper includes a gap between the static member and the whirling member and a pressurized oil reservoir formed in the gap between the static member and the whirling member. A first oil cavity is formed in the whirling member on a first end of the pressurized oil reservoir and a second oil cavity is formed in the whirling member on a second end of the pressurized oil reservoir. A first low pressure oil reservoir formed in the first oil cavity in the whirling member and a second low pressure oil reservoir formed in the second oil cavity in the whirling member. A first primary seal is positioned between the first end of the pressurized oil reservoir and the first low pressure oil reservoir, and a second primary seal is positioned between the second end of the pressurized oil reservoir and the second low pressure oil reservoir.

A method includes supplying oil to a pressurized oil reservoir formed in a gap between a whirling member and a static member. Oil is supplied to a first low pressure oil reservoir positioned on a first end of the pressurized oil reservoir. Oil is supplied to a second low pressure reservoir positioned on a second end of the pressurized oil reservoir. A first primary seal is positioned between the first end of the pressurized oil reservoir and the first low pressure oil reservoir. A second primary seal is positioned between the second end of the pressurized oil reservoir and the second low pressure oil reservoir. A whirling member is rotated about a center axis and the oil pressure is maintained in the pressurized oil reservoir.

DETAILED DESCRIPTION

Figure 1:
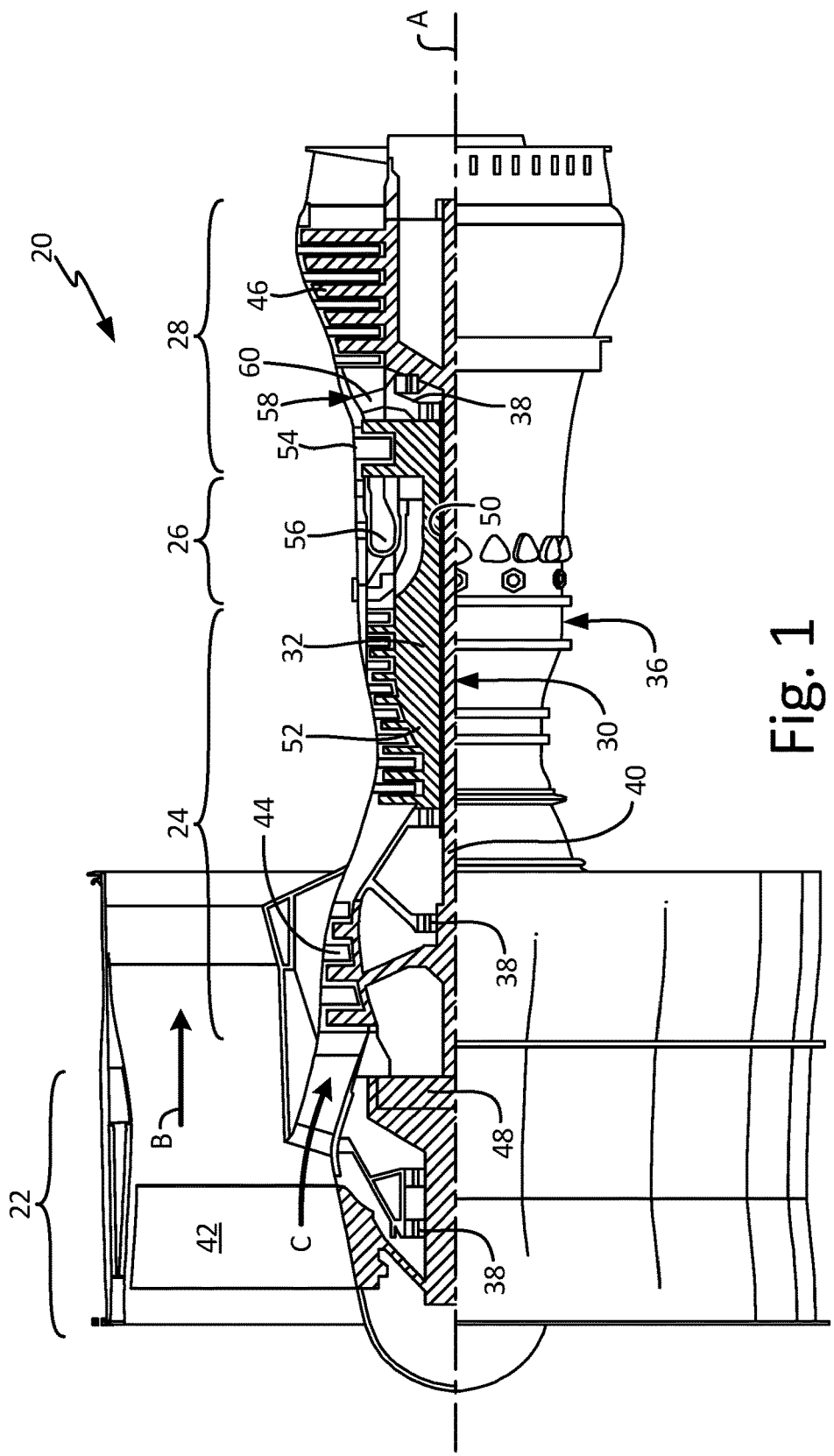
FIG. 1 is a partial cross-sectional view of an example gas turbine engine.

FIG. 1 is a partial cross-sectional view of an example gas turbine engine 20. Gas turbine engine 20 includes fan section 22, compressor section 24, combustor section 26 and turbine section 28. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. It should be further understood that the disclosed non-limiting embodiment provides generally a squeeze film damper that is suitable for many types of rotating or rotary machines as known to those of ordinary skill in the art, for example auxiliary power units.

The example gas turbine engine 20 generally includes low speed spool 30 and high speed spool 32 mounted for rotation about center axis A of gas turbine engine 20 relative to engine static structure 36 via several bearing assemblies 38. It should be understood that various bearing assemblies 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing assemblies 38 about center axis A.

Combustor 56 is arranged between high pressure compressor 52 and high pressure turbine 54. Mid-turbine frame 58 of engine static structure 36 can be arranged generally between high pressure turbine 54 and low pressure turbine 46. Mid-turbine frame 58 further supports bearing assemblies 38 in turbine section 28 as well as setting airflow entering the low pressure turbine 46.

The core airflow C is compressed first by low pressure compressor 44 and then by high pressure compressor 52, mixed with fuel and ignited in combustor 56 to produce high speed exhaust gases, and then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

As inner shaft 40 and outer shaft 50 rotate about center axis A, gas turbine engine 20 can experience vibrations due to the high rotating speed of inner shaft 40 and outer shaft 50. Dampers can be provided between rotating components, such as inner shaft 40 and outer shaft 50, and static components, such as static structure 36, to dampen the vibrations in gas turbine engine and prevent damage to the components in gas turbine engine 20. One example of a damper that can be formed between rotating components and static components is a squeeze film damper. A squeeze film damper includes a pressurized oil positioned in a gap between a whirling component and a static component in gas turbine engine 20. An exemplary embodiment of a squeeze film damper that can be positioned in gas turbine engine 20 is described in reference to FIG. 2.

Figure 2:
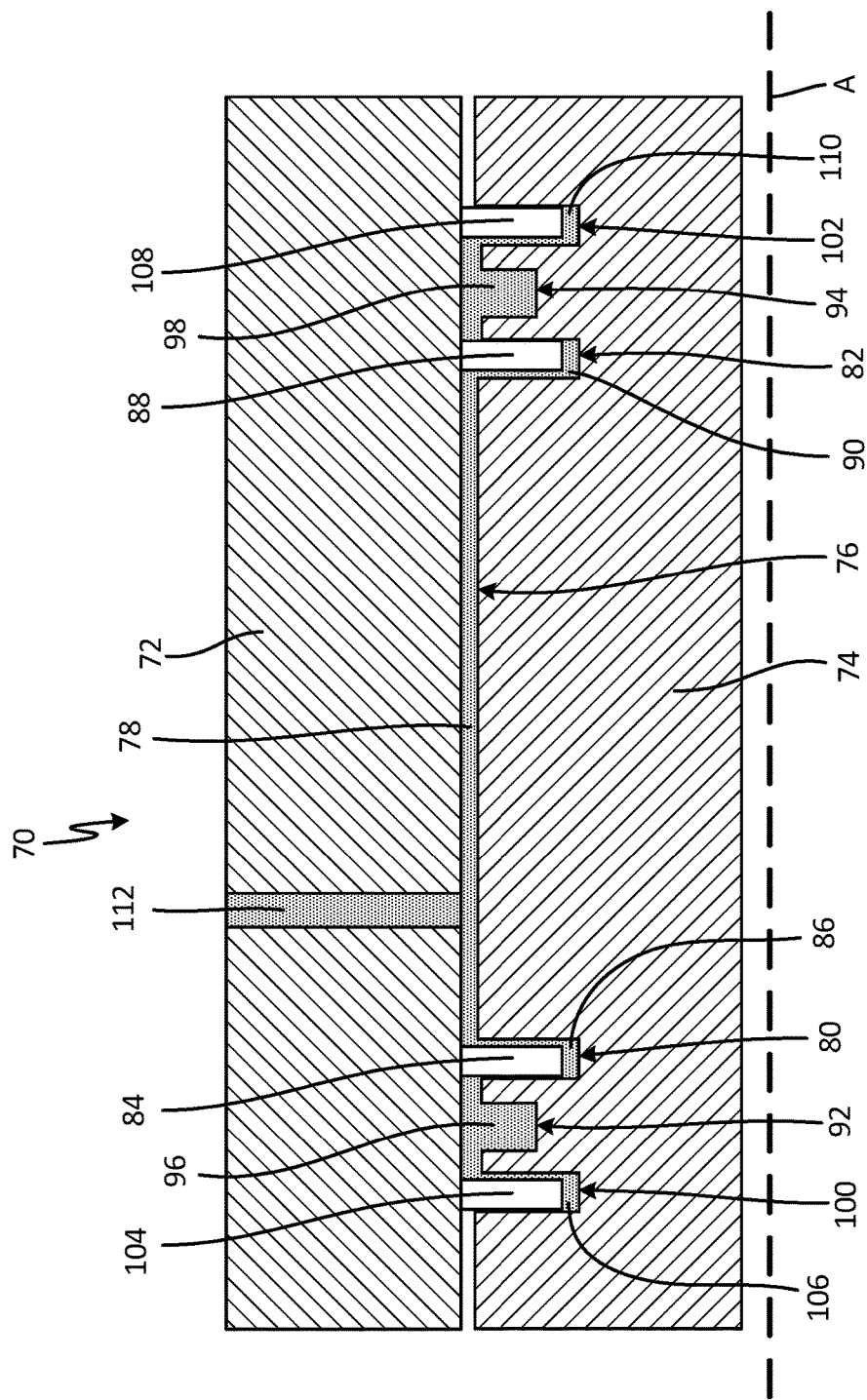
FIG. 2 is a cross-sectional view of a squeeze film damper.

FIG. 2 is a cross-sectional view of squeeze film damper 70. Squeeze film damper 70 includes static member 72, whirling member 74, pressurized oil reservoir 76, gap 78, first primary seal 80, second primary seal 82, piston ring 84, cavity 86, piston ring 88, cavity 90, first low pressure reservoir 92, second low pressure reservoir 94, cavity 96, cavity 98, first auxiliary seal 100, second auxiliary seal 102, piston ring 104, cavity 106, piston ring 108, cavity 110, and oil supply channel 112.

Squeeze film damper 70 includes static member 72 and whirling member 74. Whirling member 74 rotates about center axis A. Static member 72 is positioned radially outward from whirling member 74 with respect to center axis A. A radially outer surface of whirling member 74 is adjacent to a radially inner surface of static member 72.

Pressurized oil reservoir 76 is positioned between whirling member 74 and static member 72. Pressurized oil reservoir 76 is formed in gap 78 between the radially outer surface of whirling member 74 and the radially inner surface of static member 72.

First primary seal 80 is positioned on a first end of pressurized oil reservoir 76 and second primary seal 82 is positioned on a second end of pressurized oil reservoir 76. First primary seal 80 includes piston ring 84 positioned in cavity 86. Cavity 86 is positioned in whirling member 74 and piston ring 84 will pressurize against whirling member 74 to form a seal between whirling member 74 and static member 72. Second primary seal 82 includes piston ring 88 positioned in cavity 90. Cavity 90 is positioned in whirling member 74 and piston ring 88 will pressurize against whirling member 74 to form a seal between whirling member 74 and static member 72. In an alternate embodiment, first primary seal 80 and second primary seal 82 can be any suitable seal.

First low pressure oil reservoir 92 is positioned on a first end of first primary seal 80 and second low pressure oil reservoir 94 is positioned on a second end of second primary seal 82. First low pressure oil reservoir 92 includes cavity 96. Cavity 96 is formed in whirling member 74 and is filled with oil. Second low pressure oil reservoir 94 includes cavity 98. Cavity 98 is formed in whirling member 74 and is filled with oil.

First auxiliary seal 100 is positioned on a first end of first low pressure reservoir 92 and second auxiliary seal 102 is positioned on a second end of second low pressure reservoir 94. First auxiliary seal 100 includes piston ring 104 positioned in cavity 106. Cavity 106 is positioned in whirling member 74 and piston ring 104 will pressurize against whirling member 74 to form a seal between whirling member 74 and static member 72. Second auxiliary seal 102 includes piston ring 108 positioned in cavity 110. Cavity 110 is positioned in whirling member 74 and piston ring 108 will pressurize against whirling member 74 to form a seal between whirling member 74 and static member 72. In an alternate embodiment, first auxiliary seal 100 and second auxiliary seal 102 can be any suitable seal.

Oil supply channel 112 extends through static housing 72 to provide oil to pressurized oil reservoir 76. The oil in pressurized oil reservoir 76 develops an elevated dynamic pressure through the rotor whirling motion to provide hydrodynamic stiffening and good damping properties to squeeze film damper 70. Oil in pressurized oil reservoir 76 will move across first primary seal 80 and second primary seal 82 to fill first low pressure oil reservoir 92 and second low pressure oil reservoir 94, respectively. The oil in first low pressure oil reservoir 92 and second low pressure oil reservoir 94 is at a lower pressure than the oil in pressurized oil cavity 76.

When whirling member 74 rotates about center axis A, pressurized oil reservoir 76 forms a damper between whirling member 74 and static member 72. In prior art squeeze film dampers, air would leak into pressurized oil reservoir 76 and create a low pressure side and a high pressure side. The pressure differential in pressurized oil reservoir 76 would damage the squeeze film damper and reduce the efficiency of the damper. Providing first low pressure reservoir 92 on a first end of pressure oil reservoir 76 and second low pressure reservoir 94 on a second end of pressure oil reservoir 76, as shown in FIG. 2, prevents air from leaking into pressurized oil reservoir 76.

First low pressure oil reservoir 92 and second low pressure oil reservoir 94 are formed in cavity 96 and cavity 98, respectively. Cavity 96 and cavity 98 prevent the generation of high pressures in first low pressure oil reservoir 92 and second low pressure oil reservoir 94. The lower pressure of first low pressure oil reservoir 92 and second low pressure oil reservoir 94 also helps to prevent air from leaking into first low pressure oil reservoir 92 and second low pressure oil reservoir 94. First low pressure oil reservoir 92 and second low pressure oil reservoir 94 prevent air from leaking into pressurized oil reservoir 76. This allows pressurized oil reservoir 76 to maintain its oil pressure, which gives squeeze film damper 70 good hydrodynamic stiffness and good damping properties.

Discussion of Possible Embodiments

The following are non-exclusive descriptions of possible embodiments of the present invention.

A squeeze film damper includes a static member and a whirling member positioned adjacent to the static member. A gap is formed between the static member and the whirling member. A pressurized oil reservoir is formed in the gap between the static member and the whirling member. A first low pressure oil reservoir is formed in a first cavity in the whirling member, wherein the first low pressure oil reservoir is positioned on a first end of the pressurized oil reservoir. A second low pressure oil reservoir is formed in a second cavity in the whirling member, wherein the second low pressure oil reservoir is positioned on a second end of the pressurized oil reservoir. A first primary seal is positioned between the first end of the pressurized oil reservoir and the first low pressure oil reservoir, and a second primary seal is positioned between the second end of the pressurized oil reservoir and the second low pressure oil reservoir.

The squeeze film damper of the preceding paragraph can optionally include, additionally and/or alternatively, any one or more of the following features, configurations and/or additional components:

Wherein the first primary seal includes a first piston ring positioned in a cavity in the whirling member, wherein the first piston ring forms a seal between the whirling member and the static member, wherein the second primary seal includes a second piston ring positioned in a cavity in the whirling member, and wherein the second piston ring forms a seal between the whirling member and the static member.

A first auxiliary seal positioned adjacent to the first low pressure oil reservoir opposite the first primary seal, and a second auxiliary seal positioned adjacent to the second low pressure oil reservoir opposite the second primary seal.

Wherein the first auxiliary seal includes a third piston ring positioned in a cavity in the whirling member, wherein the third piston ring forms a seal between the whirling member and the static member, wherein the second auxiliary seal includes a fourth piston ring positioned in a cavity in the whirling member, and wherein the fourth piston ring forms a seal between the whirling member and the static member.

An oil supply channel extending through the static member to the gap between the static member and whirling member, wherein the oil supply channel supplies oil to the pressurized oil reservoir.

Wherein the oil in the pressurized oil reservoir moves across the first primary seal to the first low pressure oil reservoir, and wherein the oil in the pressurized oil reservoir moves across the second primary seal to the second low pressure oil reservoir.

A machine includes a static member, a whirling member positioned adjacent to the static member, and a squeeze film damper formed with the static member and the whirling member. The squeeze film damper includes a gap between the static member and the whirling member and a pressurized oil reservoir formed in the gap between the static member and the whirling member. A first oil cavity is formed in the whirling member on a first end of the pressurized oil reservoir and a second oil cavity is formed in the whirling member on a second end of the pressurized oil reservoir. A first low pressure oil reservoir formed in the first oil cavity in the whirling member and a second low pressure oil reservoir formed in the second oil cavity in the whirling member. A first primary seal positioned between the first end of the pressurized oil reservoir and the first low pressure oil reservoir, and a second primary seal positioned between the second end of the pressurized oil reservoir and the second low pressure oil reservoir.

The machine of the preceding paragraph can optionally include, additionally and/or alternatively, any one or more of the following features, configurations and/or additional components:

Wherein the first primary seal includes a first piston ring positioned in a cavity in the whirling member, wherein the first piston ring forms a seal between the whirling member and the static member, wherein the second primary seal includes a second piston ring positioned in a cavity in the whirling member, and wherein the second piston ring forms a seal between the whirling member and the static member.

A first auxiliary seal positioned adjacent to the first low pressure oil reservoir opposite the first primary seal, and a second auxiliary seal positioned adjacent to the second low pressure oil reservoir opposite the second primary seal.

Wherein the first auxiliary seal includes a third piston ring positioned in a cavity in the whirling member, wherein the third piston ring forms a seal between the whirling member and the static member, wherein the second auxiliary seal includes a fourth piston ring positioned in a cavity in the whirling member, and wherein the fourth piston ring forms a seal between the whirling member and the static member.

An oil supply channel extending through the static member to the gap between the static member and whirling member, wherein the oil supply channel supplies oil to the pressurized oil reservoir.

Wherein the oil in the pressurized oil reservoir moves across the first primary seal to the first low pressure oil reservoir, and wherein the oil in the pressurized oil reservoir moves across the second primary seal to the second low pressure oil reservoir.

Wherein the whirling member is a shaft, wherein the static member is a housing, and including a fan section mounted on the shaft; a compressor section, wherein a first portion of the compressor section is mounted on the shaft and a second portion of the compressor section is mounted to the housing; a combustor section mounted to the housing; and a turbine section, wherein a first portion of the turbine section is mounted on the shaft and a second portion of the turbine section is mounted to the housing; wherein the squeeze film damper is positioned between the shaft and the housing.

A method includes supplying oil to a pressurized oil reservoir formed in a gap between a whirling member and a static member. Oil is supplied to a first low pressure oil reservoir positioned on a first end of the pressurized oil reservoir. Oil is supplied to a second low pressure reservoir positioned on a second end of the pressurized oil reservoir. A first primary seal is positioned between the first end of the pressurized oil reservoir and the first low pressure oil reservoir. A second primary seal is positioned between the second end of the pressurized oil reservoir and the second low pressure oil reservoir. The whirling member is rotated about a center axis and the oil pressure is maintained in the pressurized oil reservoir.

The method of the preceding paragraph can optionally include, additionally and/or alternatively, any one or more of the following features, configurations and/or additional components:

Positioning a first auxiliary seal adjacent to the first low pressure oil reservoir opposite the first primary seal, and positioning a second auxiliary seal adjacent to the second low pressure oil reservoir opposite the second primary seal.

Wherein positioning a first primary seal includes placing a piston ring in a first primary seal cavity in the whirling member, positioning a second primary seal includes placing a piston ring in a second primary seal cavity in the whirling member, positioning a first auxiliary seal includes placing a piston ring in a first auxiliary seal cavity in the whirling member, and positioning a second auxiliary seal includes placing a piston ring in a second auxiliary seal cavity in the whirling member.

Wherein supplying oil to the pressurized oil reservoir includes moving oil through an oil supply channel in the static member to the gap between the whirling member and the static member.

Wherein supplying oil to the first low pressure oil reservoir includes moving oil from the pressurized oil reservoir across the first primary seal to the first low pressure oil reservoir, and wherein supplying oil to the second low pressure oil reservoir includes moving oil from the pressurized oil reservoir across the second primary seal to the second low pressure oil reservoir.

Wherein maintaining the oil pressure in the pressurized oil reservoir includes preventing air from leaking across the first primary seal and the second primary seal into the pressurized oil reservoir.

Wherein the first low pressure oil reservoir is formed in a first oil cavity in the whirling member, and wherein the second low pressure oil reservoir is formed in a second oil cavity in the whirling member.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A squeeze film damper comprising:
   a static member;
   a whirling member positioned adjacent to the static member, wherein a gap is formed between the static member and the whirling member;
   a pressurized oil reservoir formed in the gap between the static member and the whirling member;
   a first low pressure oil reservoir formed in a first cavity in the whirling member, wherein the first low pressure oil reservoir is positioned on a first end of the pressurized oil reservoir, and wherein the whirling member forms a first sidewall and a second sidewall of the first cavity;
   a second low pressure oil reservoir formed in a second cavity in the whirling member, wherein the second low pressure oil reservoir is positioned on a second end of the pressurized oil reservoir, and wherein the whirling member forms a third sidewall and a fourth sidewall of the second cavity;
   a first primary seal positioned between the first end of the pressurized oil reservoir and the first low pressure oil reservoir; and
   a second primary seal positioned between the second end of the pressurized oil reservoir and the second low pressure oil reservoir.

2. The squeeze film damper of claim 1, wherein:
   the first primary seal includes a first piston ring positioned in a cavity in the whirling member, wherein the first piston ring forms a seal between the whirling member and the static member; and
   the second primary seal includes a second piston ring positioned in a cavity in the whirling member, wherein the second piston ring forms a seal between the whirling member and the static member.

3. The squeeze film damper of claim 1, and further comprising:
   a first auxiliary seal positioned adjacent to the first low pressure oil reservoir opposite the first primary seal; and
   a second auxiliary seal positioned adjacent to the second low pressure oil reservoir opposite the second primary seal.

4. The squeeze film damper of claim 3, wherein:
   the first auxiliary seal includes a third piston ring positioned in a cavity in the whirling member, wherein the third piston ring forms a seal between the whirling member and the static member; and
   the second auxiliary seal includes a fourth piston ring positioned in a cavity in the whirling member, wherein the fourth piston ring forms a seal between the whirling member and the static member.

5. The squeeze film damper of claim 1, and further comprising:
   an oil supply channel extending through the static member to the gap between the static member and whirling member, wherein the oil supply channel supplies oil to the pressurized oil reservoir.

6. The squeeze film damper of claim 5, wherein the oil in the pressurized oil reservoir moves across the first primary seal to the first low pressure oil reservoir, and wherein the oil in the pressurized oil reservoir moves across the second primary seal to the second low pressure oil reservoir.

7. A machine comprising:
   a static member;
   a whirling member positioned adjacent to the static member; and
   a squeeze film damper formed with the static member and the whirling member, wherein the squeeze film damper comprises:
      a gap between the static member and the whirling member;
      a pressurized oil reservoir formed in the gap between the static member and the whirling member;
      a first oil cavity formed in the whirling member on a first end of the pressurized oil reservoir, and wherein the whirling member forms a first sidewall and a second sidewall of the first oil cavity;
      a second oil cavity formed in the whirling member on a second end of the pressurized oil reservoir, and wherein the whirling member forms a third sidewall and a fourth sidewall of the second oil cavity;
      a first low pressure oil reservoir formed in the first oil cavity in the static member; and
      a second low pressure oil reservoir formed in the second oil cavity in the static member;
      a first primary seal positioned between the first end of the pressurized oil reservoir and the first low pressure oil reservoir; and
      a second primary seal positioned between the second end of the pressurized oil reservoir and the second low pressure oil reservoir.

8. The machine of claim 7, wherein:
   the first primary seal includes a first piston ring positioned in a cavity in the whirling member, wherein the first piston ring forms a seal between the whirling member and the static member; and
   the second primary seal includes a second piston ring positioned in a cavity in the whirling member, wherein the second piston ring forms a seal between the whirling member and the static member.

9. The machine of claim 7, and further comprising:
a first auxiliary seal positioned adjacent to the first low pressure oil reservoir opposite the first primary seal; and
a second auxiliary seal positioned adjacent to the second low pressure oil reservoir opposite the second primary seal.

10. The machine of claim 9, wherein:
the first auxiliary seal includes a third piston ring positioned in a cavity in the whirling member, wherein the third piston ring forms a seal between the whirling member and the static member; and
the second auxiliary seal includes a fourth piston ring positioned in a cavity in the whirling member, wherein the fourth piston ring forms a seal between the whirling member and the static member.

11. The machine of claim 7, and further comprising:
an oil supply channel extending through the static member to the gap between the static member and whirling member, wherein the oil supply channel supplies oil to the pressurized oil reservoir.

12. The machine of claim 11, wherein the oil in the pressurized oil reservoir moves across the first primary seal to the first low pressure oil reservoir, and wherein the oil in the pressurized oil reservoir moves across the second primary seal to the second low pressure oil reservoir.

13. The machine of claim 7, wherein the whirling member is a shaft, wherein the static member is a housing, and further comprising:
a fan section mounted on the shaft;
a compressor section, wherein a first portion of the compressor section is mounted on the shaft and a second portion of the compressor section is mounted to the housing;
a combustor section mounted to the housing; and
a turbine section, wherein a first portion of the turbine section is mounted on the shaft and a second portion of the turbine section is mounted to the housing;
wherein the squeeze film damper is positioned between the shaft and the housing.

14. A method comprising:
supplying oil to a pressurized oil reservoir formed in a gap between a whirling member and a static member;
supplying oil to a first low pressure oil reservoir positioned on a first end of the pressurized oil reservoir, wherein the first low pressure oil reservoir is formed in a first cavity, and wherein the whirling member forms a first sidewall and a second sidewall of the first cavity;
supplying oil to a second low pressure reservoir positioned on a second end of the pressurized oil reservoir, wherein the second low pressure oil reservoir is formed in a second cavity, and wherein the whirling member forms a third sidewall and a fourth sidewall of the second cavity;
positioning a first primary seal between the first end of the pressurized oil reservoir and the first low pressure oil reservoir;
positioning a second primary seal between the second end of the pressurized oil reservoir and the second low pressure oil reservoir;
whirling the whirling member about a center axis; and
maintaining the oil pressure in the pressurized oil reservoir.

15. The method of claim 14, and further comprising:
positioning a first auxiliary seal adjacent to the first low pressure oil reservoir opposite the first primary seal; and
positioning a second auxiliary seal adjacent to the second low pressure oil reservoir opposite the second primary seal.

16. The method of claim 15, wherein:
positioning a first primary seal includes placing a piston ring in a first primary seal cavity in the whirling member;
positioning a second primary seal includes placing a piston ring in a second primary seal cavity in the whirling member;
positioning a first auxiliary seal includes placing a piston ring in a first auxiliary seal cavity in the whirling member; and
positioning a second auxiliary seal includes placing a piston ring in a second auxiliary seal cavity in the whirling member.

17. The method of claim 14, wherein supplying oil to the pressurized oil reservoir includes moving oil through an oil supply channel in the static member to the gap between the whirling member and the static member.

18. The method of claim 14, wherein:
supplying oil to the first low pressure oil reservoir includes moving oil from the pressurized oil reservoir across the first primary seal to the first low pressure oil reservoir; and
supplying oil to the second low pressure oil reservoir includes moving oil from the pressurized oil reservoir across the second primary seal to the second low pressure oil reservoir.

19. The method of claim 14, wherein maintaining the oil pressure in the pressurized oil reservoir includes preventing air from leaking across the first primary seal and the second primary seal into the pressurized oil reservoir.

20. The method of claim 14, wherein the first low pressure oil reservoir is formed in a first oil cavity in the whirling member, and wherein the second low pressure oil reservoir is formed in a second oil cavity in the whirling member.

* * * * *